March 12, 1940.    G. A. LYON    2,192,922
EXHAUST PIPE EXTENSION
Filed Sept. 20, 1937
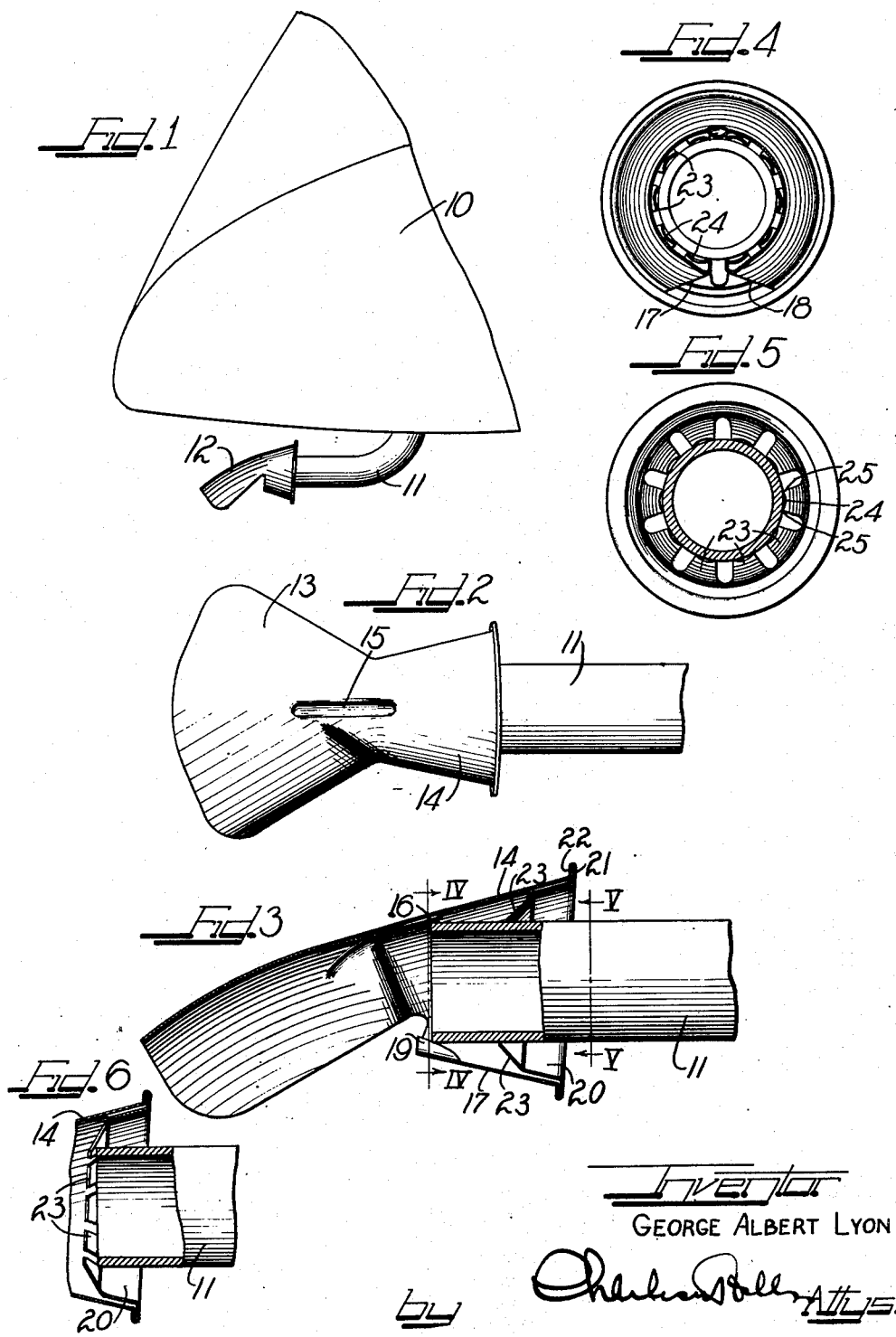
Inventor
GEORGE ALBERT LYON Patented Mar. 12, 1940

2,192,922

UNITED STATES PATENT OFFICE 2,192,922

EXHAUST PIPE EXTENSION

George Albert Lyon, Allenhurst, N. J.

Application September 20, 1937, Serial No. 164,666

5 Claims. (Cl. 138—25)

This invention relates to an exhaust pipe extension and more particularly to an ornamental extension member which may readily and quickly be assembled on the exhaust pipe of a motor vehicle.

Many arrangements have been provided in the past for enhancing the appearance of the end of the exhaust pipe of a motor vehicle. These arrangements, however, have not been entirely satisfactory. It is important in constructing an exhaust pipe extension member to provide a member which will be ornamental in appearance, which will be rugged and reliable in use so that it will withstand the excessive vibrations of a vehicle while in motion, and which is equipped with means which will permit it to be readily and quickly mounted on the exhaust pipe.

It is an object of this invention to provide a novel exhaust pipe extension member having novel means thereon for securing the member to the exhaust pipe.

It is another object of this invention to provide a novel exhaust pipe extension member which is economical to manufacture, which is rugged and reliable in use, and which is equipped with novel means for quickly and firmly securing the member to an exhaust pipe.

It is a further object of this invention to provide a novel exhaust pipe extension member which may be formed from a piece of sheet metal stock.

Another and further object of this invention is to provide a novel method and means for securing a flared hood extension member to a metal pipe.

Another and still further object of this invention is to provide a novel exhaust pipe extension member having novel means thereon for securing it to an exhaust pipe including means for preventing rotation of the member with respect to the pipe after it is once mounted thereon.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawing, in which:

Figure 1 is a side elevational view of the rear end of a motor vehicle showing an exhaust pipe equipped with a flared hood extension member;

Figure 2 is a top view of the flared hood extension member and the end of the exhaust pipe to which it is connected;

Figure 3 is a side elevational view partly in cross section of the flared hood extension member of Figure 2;

Figure 4 is a cross sectional end view of the extension member taken along the line IV—IV of Figure 3;

Figure 5 is a cross sectional end view of the extension member taken along the line V—V of Figure 3; and Figure 6 is a fragmentary view illustrating the position of the teeth or the attaching fingers of the extension member as the member is being moved into position over the end of the exhaust pipe.

Referring now to the specific embodiment of the invention illustrated by the various figures of the drawing, there is illustrated in Figure 1 the rear end of an automobile 10 which is equipped on its under side with an exhaust pipe 11.

Secured to the outer end of the exhaust pipe 11 is a flared hood extension member 12 which is constructed and formed in accordance with the teachings of the present invention.

In Figures 2 to 5 of the drawing, extension member 12 is illustrated in detail. As shown in these figures, the extension member 12 is formed from a piece of sheet metal stock and includes a flared hood portion 13, which extends rearwardly and downwardly beyond the end of the exhaust pipe 11, and a split collar portion 14 which is disposed in spaced relationship about the end of exhaust pipe 11. As may be seen from an inspection of Figure 3 of the drawing, the collar portion 14 is generally conical in shape with the larger diameter thereof adjacent its forward end. That is to say, the collar portion 14 gradually increases from a diameter slightly greater than the diameter of the exhaust pipe 11 at the end of the exhaust pipe 11 to a somewhat larger diameter at its forward end where the novel clamping ring (presently to be described) is secured thereto.

The top of the extension member 12 in proximity to the end of the exhaust pipe 11 is longitudinally creased or indented as at 15. This longitudinal indentation 15 provides an abutment 16 which engages the top side of the exhaust pipe 11 and spaces the collar member 14 therefrom. The lower longitudinal split edges 17 and 18 are relatively close together at their rearward ends and diverge gradually outwardly toward the forward end as may be seen best in Figure 4. Edge portions 17 and 18 are curled radially inwardly as at 19 opposite their rearward ends so as to extend into engagement with the underside of exhaust pipe 11 and space the lower part of the collar portion 14 therefrom.

The novel means by which the extension member 12 is secured to the exhaust pipe 11 includes a clamping ring 20 which is secured to the forward end of the collar portion 14, and more particularly the forward end of the collar portion 14 is provided with a radially outwardly extending flange 21 about which the outer edge 22 of the clamping ring 20 is crimped or otherwise suitably secured thereto.

Clamping ring 20 is provided with a plurality of circumferentially disposed resilient teeth 23 which extend rearwardly and inwardly into biting engagement with the exhaust pipe 11. The ends of teeth 23 are each arched out as at 24, so that each tooth 23 is provided with a pair of projections 25 which bite into the metal of the exhaust pipe and prevent not only rearward movement of the extension 12 with respect to the exhaust pipe 11 but also prevent relative rotation between extension member 12 and exhaust pipe 11.

From an inspection of Figure 3 of the drawing, it will readily be understood that while the extension member may readily be slipped over the end of exhaust 11 by virtue of the fact that the teeth 23 will be flexed or cammed outwardly as they pass over the end of pipe 11 (see Figure 6), any tendency of the extension member 12 to move in a reverse direction will merely cause the teeth 23 to bite deeply into the metal of the exhaust pipe.

To assemble the flared hood extension member 12 on the end of exhaust pipe 11, it is simply necessary to push the forward end of the collar portion 14 over the end of the exhaust pipe 11 until the end of the pipe 11 is engaged by the abutment 16 and the inturned edge portion 19. The extension member 12 is now securely mounted on the exhaust pipe 11, for any tendency of the member to move further onto the exhaust pipe is resisted by the abutment 16 provided by the indented portion 15 and the inturned edges 19; and any tendency for the extension member 12 to move in a reverse direction is prevented by the biting engagement which the teeth 23 make with the metal of the exhaust pipe 11. Relative rotation of the extension member 12 with respect to exhaust 11 is prevented by the projections 25 on teeth 23, as well as by the engagement of the inturned edges 19. It will be understood that since the teeth 23 are formed of resilient material and since the abutment 16 and the inturned edges 19 are disposed at an angle to each other and converge to a much smaller diameter than that of the exhaust pipe 11, the extension member 12 may readily accommodate itself to substantial variations in the diameter of the exhaust pipe 11, such as may occur in large scale manufacturing activities. Furthermore, by providing the collar portion 14 of the extension member 12 with a diameter greater than that of the exhaust pipe 11, the attaching or securing fingers may be completely concealed thereby. The fingers 23 will not, therefore, detract from the general appearance of the flared hood exhaust pipe extension.

It will, of course, be understood that the exhaust pipe extension 12 may be given a high metal polish or otherwise suitably finished such as by chromium plating, painting, enameling, or the like.

From the above description, it will be apparent that I have provided an extraordinarily simple exhaust pipe extension member which is economical to manufacture, which is rugged and reliable in use, and which may be readily assembled on the end of an exhaust pipe by an unskilled person. It will furthermore be understood from a cursory inspection of the various figures of the drawing that I have provided an exhaust pipe extension which greatly enhances the general appearance of the rear part of an automobile.

While I have shown a particular embodiment of my invention, it will, of course, be understood that I do not wish to be limited thereto, since many modifications may be made, and I therefore contemplate by the appended claims to cover all such modifications which fall within the true spirit and scope of my invention.

I claim as my invention:

1. As an article of manufacture, an extension member for an exhaust pipe including a collar portion for disposition around the end of the exhaust pipe and in spaced relationship thereto, one end of said collar portion having inwardly extending portions for engaging the upper and lower sides of said pipe and the other end of said collar portion having a plurality of fingers for engaging and gripping said pipe to hold said member thereon.

2. As an article of manufacture, a sheet metal extension member for a metal pipe comprising a collar portion for disposition around said pipe and provided with means for limiting its movement onto said pipe, a flared hood portion for extension beyond the end of said pipe, and a clamping ring secured to said collar portion having a plurality of rearwardly and inwardly inclined teeth which extend into biting engagement with said pipe when said member is mounted thereon, said collar portion having a smaller diameter adjacent said flared hood portion than adjacent its forward end.

3. As an article of manufacture, a sheet metal extension member for a metal pipe comprising a split collar portion for disposition around said pipe, a flared hood portion for extension beyond the end of said pipe, and a clamping ring secured to said collar portion having a plurality of rearwardly and inwardly inclined teeth which extend into biting engagement with said pipe when said member is mounted thereon, said split collar portion having a rear portion of each of its longitudinal edges bent radially inwardly to engagement with said pipe.

4. As an article of manufacture, an extension member for an exhaust pipe including an annular base portion for disposition around the end of the exhaust pipe having a plurality of circumferentially disposed rearwardly inclined teeeth which extend into biting engagement with said pipe when said extension member is mounted thereon, the lateral edges of said teeth lying approximately in axial planes and the ends of said teeth being arced out on radii shorter than the radius of the pipe to form a pair of projections on each tooth, whereby said projections point obliquely around the pipe in opposite directions and prevent rotation of said member relative to said pipe.

5. As an article of manufacture, an exhaust deflector comprising a sheet metal funnel, circumferentially spaced non-annular projections within said funnel, the distances from the axis of said funnel to said projections being less than the radius of the small end of the funnel so that the projections may be able to hold the funnel on the end of a pipe with an air space between the pipe and the funnel, and a deflector portion forming a continuation of one side of and extending across the axis of the funnel at its small end.

GEORGE ALBERT LYON.